US012794176B2

(12) United States Patent
Choi et al.

(10) Patent No.: US 12,794,176 B2
(45) Date of Patent: Nov. 10, 2026

(54) CONNECTOR ASSEMBLY

(71) Applicant: Tyco Electronics AMP Korea Co., Ltd., Gyeongsan (KR)

(72) Inventors: Ki Ho Choi, Gyeongsan-si (KR); Keun Taek Lim, Gyeongsan-si (KR)

(73) Assignee: TYCO ELECTRONIC AMP KOREA CO., LTD., Gyeongsan-si (KR)

( * ) Notice: Subject to any disclaimer, the term of this patent is extended or adjusted under 35 U.S.C. 154(b) by 273 days.

(21) Appl. No.: 18/506,198

(22) Filed: Nov. 10, 2023

(65) Prior Publication Data

US 2024/0162654 A1 May 16, 2024

(30) Foreign Application Priority Data

Nov. 11, 2022 (KR) ........................ 10-2022-0150659

(51) Int. Cl.
*H01R 13/629* (2006.01)

(52) U.S. Cl.
CPC .............................. *H01R 13/62933* (2013.01)

(58) Field of Classification Search
CPC ............ H01R 13/62933; H01R 13/639; H01R 13/62955; H01R 13/62938
USPC .......................................................... 439/345
See application file for complete search history.

(56) References Cited

U.S. PATENT DOCUMENTS 5,344,194 A * 9/1994 Hatagishi ......... H01R 13/62933 285/308
2005/0245114 A1* 11/2005 Shiga ............... H01R 13/62938 439/157
2011/0130026 A1* 6/2011 Makino ............ H01R 13/62966 439/345
2020/0388961 A1* 12/2020 Kobayashi ....... H01R 13/62938
2021/0408725 A1* 12/2021 Lim ................. H01R 13/62955

* cited by examiner

*Primary Examiner* — Tulsidas C Patel
*Assistant Examiner* — Thaslimur Rahman

(57) ABSTRACT

A connector assembly comprises a first connector, a locking lever rotatably attached to the first connector, and a second connector engageable with the first connector. The second connector defines a first guide protrusion extending from a surface thereof. In a closed position, the locking lever engages with the second connector and prevents the second connector from disengaging from the first connector. The first guide protrusion disconnects the locking lever from the first connector and biases the locking lever in an opening direction toward an open position.

19 Claims, 11 Drawing Sheets

CONNECTOR ASSEMBLY

CROSS-REFERENCE TO RELATED APPLICATION

This application claims the priority to Korean Patent Application No. 10-2022-01560659 filed on Nov. 11, 2022, in the Korean Intellectual Property Office, the disclosure of which is incorporated herein by reference for all purposes.

FIELD OF THE INVENTION

The present invention relates to an electrical connector assembly.

BACKGROUND

A connector is a type of electric component that enables or disables an electrical connection. A connector for connecting electric components to one another may include a socket functioning as a conductive signal path and a shield surrounding the socket. The shield may provide a return path and prevent a wireless radio frequency (RF) from leaking from a signal path.

A connector assembly may be required to connect the connector to a device. For example, an automobile includes electric components, such as an electrical component or a sensor. The electric components are electrically connected to another electronic component or to a power supply through a cable and the connector assembly.

SUMMARY

According to an embodiment of the present disclosure, a connector assembly comprises a first connector, a locking lever rotatably attached to the first connector, and a second connector engageable with the first connector. The second connector defines a first guide protrusion extending from a surface thereof. In a closed position, the locking lever engages with the second connector and prevents the second connector from disengaging or disconnecting from the first connector. The first guide protrusion disengages or disconnects the locking lever from the first connector and biases the locking lever in an opening direction toward an open position.

BRIEF DESCRIPTION OF THE DRAWINGS

The invention will now be described by way of example with reference to the accompanying Figures, of which.

DETAILED DESCRIPTION OF THE EMBODIMENTS

Figure 1:
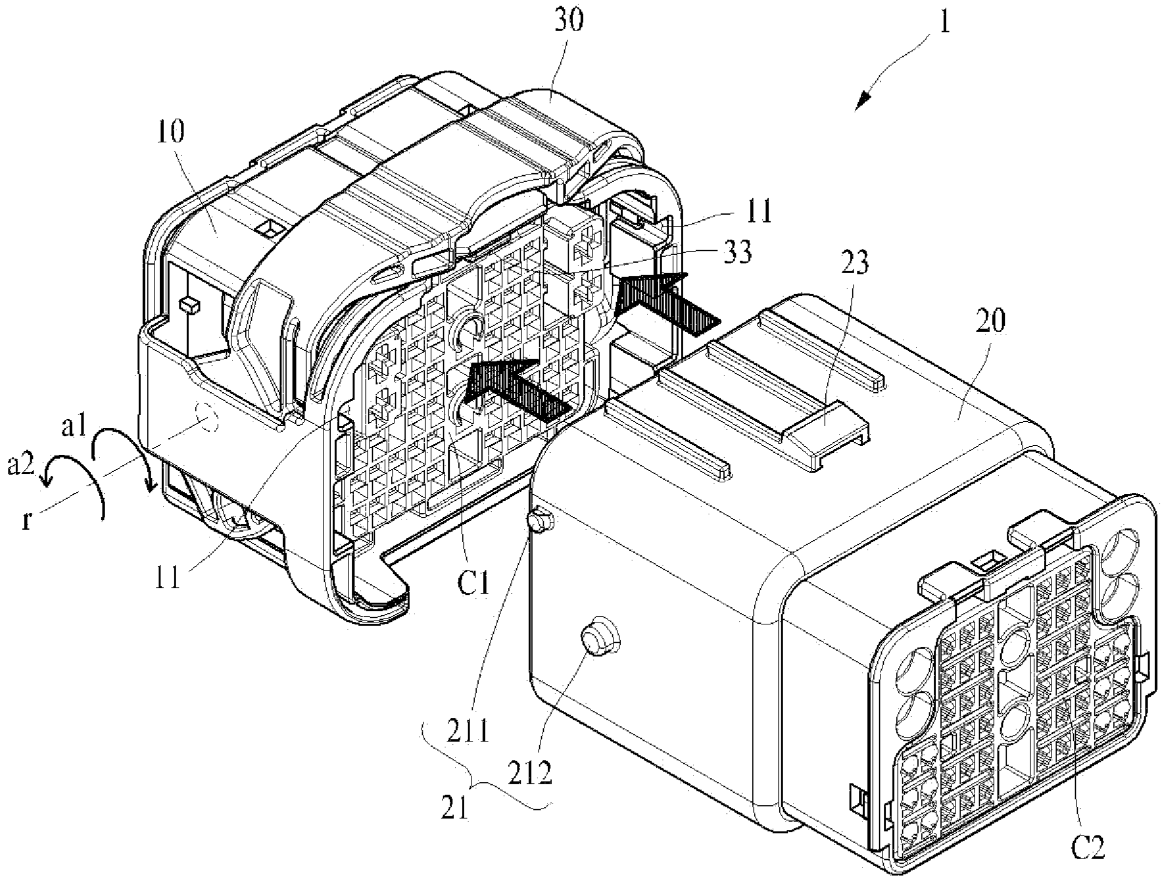
FIG. 1 is a diagram illustrating a connector assembly according to an embodiment.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, terms or words used in the present specification and claims should not be construed in general meanings or dictionary definitions, and based on a principle that the inventor may properly define the concept of terms to best describe their invention, the terms or words should be construed as meanings and concepts consistent with the technical idea of the invention according to an embodiment.

The singular forms “a”, “an”, and “the” are intended to include the plural forms as well, unless the context clearly indicates otherwise. It will be further understood that the terms “comprises/comprising” and/or “includes/including” when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Further, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

FIG. 1 is a diagram illustrating a connector assembly 1 according to an embodiment. Referring to FIG. 1, the connector assembly 1 may include a first connector 10, a second connector 20, and a locking lever 30. The first connector 10 may be engaged with the second connector 20. A first terminal c1 may be arranged inside the first connector 10. The first terminal c1 may be connected to a second terminal c2 arranged inside the second connector 20.

The first connector 10 may be connected to the locking lever 30. More specifically, the first connector 10 may rotatably support the locking lever 30. A rotation shaft for rotatably supporting the locking lever 30 may be on an inner side surface of the first connector 10. The locking lever 30 may rotate in both directions by using the rotation shaft on an inner side surface of the first connector 10 as a rotation axis r.

The first connector 10 may include a first guide rail 11 and a second guide rail 12. The first guide rail 11 and the second guide rail 12 may be recessed from an inner side surface of the first connector 10. The first guide rail 11 and the second guide rail 12 may accommodate a guide protrusion 21 of the second connector 20 such that the second connector 20 connects to the first connector 10. The guide protrusion 21 of the second connector 20 may pass through the first guide rail 11 of the first connector 10 and the second guide rail 12 of the first connector while the second connector connects to the first connector and may touch the locking lever 30.

The second terminal c2 may be arranged inside the second connector 20. The second terminal c2 may be accommodated by the second connector 20 and connect to the first terminal c1 of the first connector 10. The second connector 20 may engage with the first connector 10. The second connector 20 may connect to the first connector 10 in one direction. The second connector 20 may slide inside the first connector 10.

When engaged with the first connector 10, disengagement of the second connector 20 therefrom may be prevented by the locking lever 30. The second connector 20, when connecting to the first connector 10, may engage with the locking lever 30. The second connector 20 may include a sub-engagement protrusion 23 preventing the disengagement by engaging with the locking lever 30. The sub-engagement protrusion 23 may protrude from a surface of the second connector 20.

The second connector 20 may include the guide protrusion 21. There may be a plurality of guide protrusions 21. The guide protrusion 21 may be on both sides of the second connector 20, neighboring the surface of the second connector 20 where the sub-engagement protrusion 23 is located. The guide protrusion 21 may protrude from both sides of the second connector 20. The guide protrusion 21 may include a first guide protrusion 211 and a second guide protrusion 212. The first guide protrusion 211 may be adjacent, close, or proximate to an edge of the second connector 20. The second guide protrusion 212 may be farther from the edge of the second connector 20 than the first guide protrusion 211. The first guide protrusion 211 may pass through the first guide rail 11 of the first connector 10 while the second connector 20 connects to the first connector. The first guide protrusion 211 may engage with the locking lever 30 while the second connector 20 connects to the first connector 10. The first guide protrusion 211 may touch the locking lever 30 after passing through the first guide rail 11. The first guide protrusion 211, while touching the locking lever 30, may press the locking lever in an engagement direction of a connector and a perpendicular direction to the engagement direction. The first guide protrusion 211 may press the locking lever 30 such that the locking lever 30 may rotate in a first direction a2 in which the locking lever opens.

The second guide protrusion 212 may pass through the second guide rail 12 of the first connector 10 while the second connector 20 connects to the first connector. The second guide protrusion 212 may engage with the locking lever 30 while the second connector 20 connects to the first connector 10. The second connector 212, by engaging with the locking lever 30 while the second connector 20 connects to the first connector 10, may rotate the locking lever in a second direction a1 in which the locking lever closes. In addition, while the second guide protrusion 212 touches the locking lever 30, a user may rotate the locking lever in the second direction a1 such that the second connector 20 may be inserted inside the first connector 10.

The locking lever 30 may be rotatably connected to the first connector 10. The locking lever 30 may prevent the disengagement of the second connector 20 engaging with the first connector 10. The locking lever 30 may be on the rotation shaft on an inner side surface of the first connector 10 and rotate around the rotation axis r in the first direction a1 or the second direction a2. The locking lever 30 may rotate around the rotation axis r within a predetermined range with respect to the first connector 10. The locking lever 30 may engage with the second connector 20 while the second connector connects to the first connector 10. The locking lever 30, by engaging with the second connector 20, may rotate around the rotation axis r in the first direction a1 or the second direction a2 according to the movement of the second connector. The locking lever 30 may rotate in the first direction a2 in which the locking lever opens while the connection of the second connector 20 to the first connector 10 is performed, and then, may rotate in the second direction a1 in which the locking lever closes. The locking lever 30 may include an engagement protrusion 33. The engagement protrusion 33, by engaging with the sub-engagement protrusion 23, may prevent the second connector 20 that has been fully connected to the first connector 10 from disconnecting from the first connector. When the locking lever 30 engages with the second connector 20 and rotates in the second direction a1 according to the movement of the second connector, the engagement protrusion 33 may touch the sub-engagement protrusion 23.

According to the prior art, an engagement protrusion may fix a locking lever to a first connector before a second connector connects to the first connector. In addition, a separate protrusion for disengaging from the engagement protrusion may be provided on the second connector and adapted to disengage the engagement protrusion from the first connector. The protrusion may protrude from an upper side surface of the second connector and disengage the engagement protrusion from the first connector by pressing the engagement protrusion. However, in the prior art, a direction of the engagement protrusion disengaged from the first connector may not be the same, on the 2-axis plane, as a direction of the engagement protrusion pressed by the protrusion on the second connector. In other words, the engagement protrusion may not be disengaged from the first connector because the protrusion on the second connector presses the engagement protrusion of the locking lever in a connecting direction of the second connector while the engagement protrusion moves in a direction perpendicular to the connecting direction of the second connector to be disengaged from the first connector. Such a structural error may cause the engagement protrusion not to be disengaged from the first connector and may increase the likelihood of damage to the engagement protrusion as a result of increased pressing force of the locking lever. In addition, when an external impact on the locking lever is similar to a 2-axis direction in which the protrusion presses the locking lever, the engagement force of the locking lever may be cancelled. As there is no separate structure for protecting an engagement structure of the locking lever with the first connector, the external impact may damage the engagement structure or cancel the engagement force.

According to embodiments of the present disclosure, instead of engaging the locking lever 30 with the first connector 10 through a configuration of the engagement protrusion 33, the locking lever 30 and the first connector may be fixed to each other by using a configuration of a locking lever arm (e.g., a locking lever arm 31 with reference to FIG. 2) to be described below. The engagement protrusion 33 of the locking lever 30 may only engage with the sub-engagement protrusion 23 on the second connector 20 and may not have any structural engagement with the first connector 10. The locking lever arm to be described below may engage with the first connector 10 and fix the locking lever 30 to the first connector and the fixing force of the locking lever arm may be cancelled by moving the locking lever arm in a 3-axis direction perpendicular to the 2-axis direction in which the locking lever is rotated by the first guide protrusion 211. The first guide protrusion 211 may disengage the locking lever 30 from the first connector 10 and rotate the locking lever. Specifically, the first guide protrusion 211 may press the locking lever 30 and rotate the locking lever in a second direction (i.e., an opening direction) and may disengage the locking lever from the first connector 10 by cancelling the engagement of the first connector with the locking lever arm. Accordingly, the engagement force of the locking lever 30 with the first connector 10 may not be cancelled by an external force and may be cancelled through a connector engagement process such that the locking lever may move in opening and closing directions. The shape and function of the locking lever arm for engaging with the first connector 10 are described in detail below with reference to FIG. 2.

Figure 2:
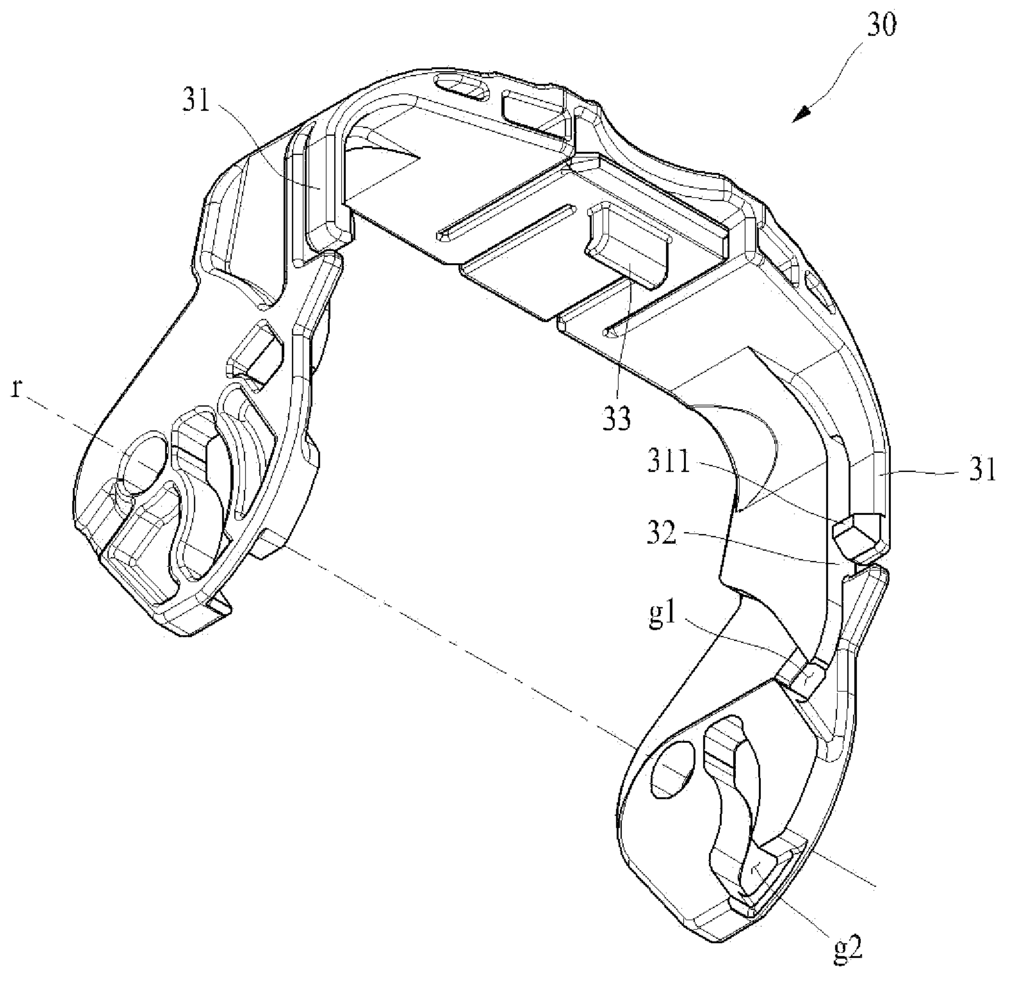
FIG. 2 is a diagram illustrating a locking lever of a connector assembly according to an embodiment.

FIG. 2 is a diagram illustrating a locking lever of a connector assembly, according to an embodiment. Referring to FIG. 2, a locking lever 30 may move by rotating around a rotation axis r with respect to a first connector. The locking lever 30 may be rotatably connected to a rotation shaft of the first connector. The locking lever 30 may include a locking lever body 32, a locking lever arm 31 connected to the locking lever body, an engagement protrusion 33, a first guide g1, and a second guide g2.

The locking lever arm 31 may extend from the locking lever body 32. The locking lever arm 31 may be a rectangular member having a longitudinal direction. An edge of the locking lever arm 31 may be connected to the locking lever body 32. The locking lever arm 31 may elastically transform at a connection part to the locking lever body 32. The locking lever arm 31 may engage with the first connector.

The locking lever arm 31 may include a locking lever arm protrusion 311 for structurally engaging with the first connector. The locking lever arm protrusion 311 may engage with the first connector before a second connector connects to the first connector and may prevent the locking lever 30 from disengaging from the first connector. The locking lever arm protrusion 311 may include an inclined surface for touching a guide protrusion of the second connector and sliding such that the locking lever 30 may be elastically transformed in a predetermined direction when the second connector connects to the first connector.

The locking lever arm 31 may prevent the locking lever 30 from freely moving by rotating around a rotation axis r with respect to the first connector before the second connector connects to the first connector by engaging with the first connector and the locking lever. Accordingly, damage, which may be caused by the locking lever 30 freely rotating and moving, for example, damage which may be caused while a component moves, may be prevented.

The locking lever body 32 may support the locking lever arm 31. The locking lever body 32 may form the structural skeleton of the locking lever 30. The locking lever body 32 may be pressed by the guide protrusion of the second connector while the second connector connects to the first connector. The locking lever body 32 may rotate around the rotation axis r connected to the first connector in both directions.

The engagement protrusion 33 may protrude from an inner side surface of the locking lever body 32. The engagement protrusion 33 may prevent the disengagement of the second connector by engaging with the second connector when the second connector engages with the first connector. The engagement protrusion 33 may engage with a sub-engagement protrusion of the second connector.

The first guide g1 may be recessed from an inner side surface of the locking lever body 32. The first guide g1 may accommodate a first guide protrusion of the second connector while the second connector connects to the first connector. The first guide protrusion of the second connector may slide along the first guide g1.

The second guide g2 may be spaced apart from the first guide g1 on an inner side surface of the locking lever body 32. The second guide g2 may be recessed from the inner side surface of the locking lever body 32. The second guide g2 may accommodate a second guide protrusion of the second connector while the second connector connects to the first connector. The second guide protrusion of the second connector may slide along the second guide g2. The sequence and structure of engaging the first guide g1 and the second guide g2 respectively with the first guide protrusion of the second connector and the second guide protrusion of the second connector are described in detail below with reference to FIGS. 5A to 5E.

Figure 3:
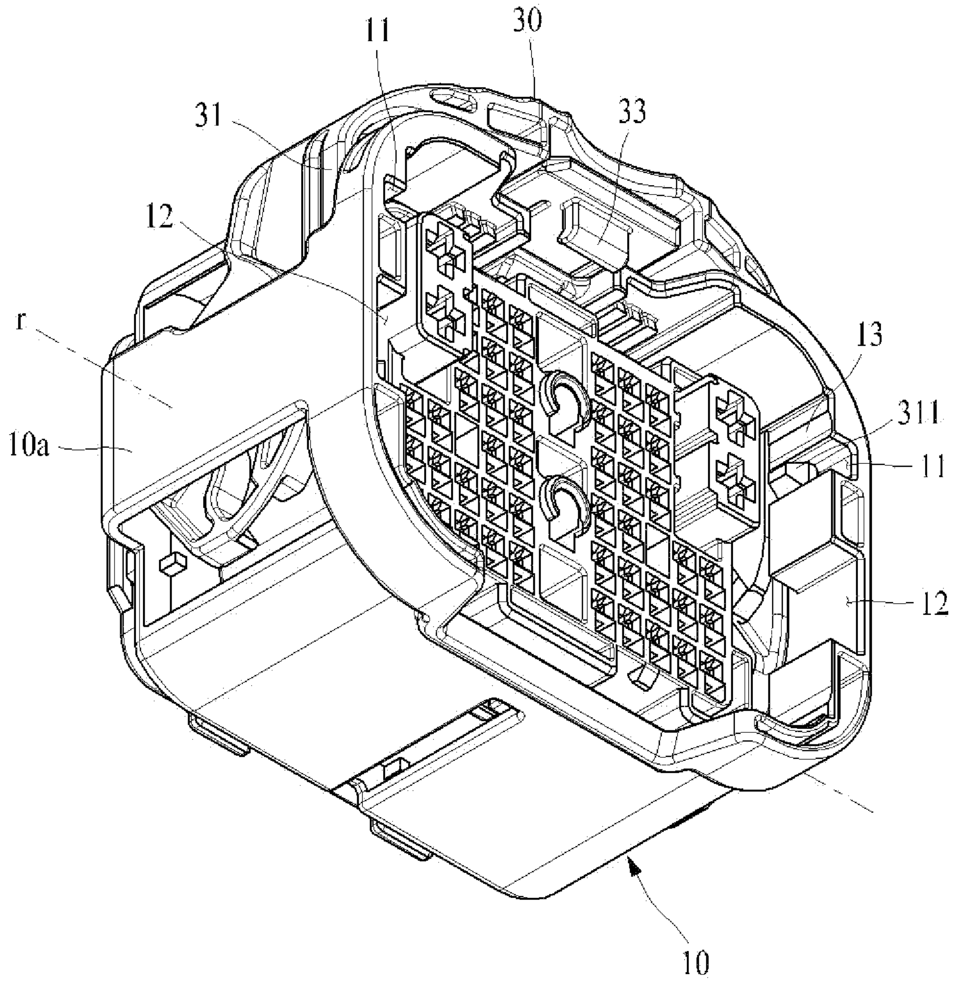
FIG. 3 is a diagram illustrating engagement of a locking lever with a first connector of a connector assembly according to an embodiment.

FIG. 3 is a diagram illustrating engagement of a locking lever with a first connector of a connector assembly, according to an embodiment. Referring to FIG. 3, a first terminal may be arranged inside a first connector 10. The first connector 10 may be connected to a locking lever 30. The first connector 10 may rotatably support the locking lever 30. A rotation shaft for rotatably supporting the locking lever 30 may be on an inner side surface of the first connector 10. The locking lever 30 may rotate in both directions by using the rotation shaft on an inner side surface of the first connector 10 as a rotation axis r.

The first connector 10 may include a first guide rail 11 and a second guide rail 12. The first guide rail 11 and the second guide rail 12 may be recessed from an inner side surface of the first connector 10. The first guide rail 11 and the second guide rail 12 may accommodate a guide protrusion of a second connector such that the second connector connects to the first connector 10. A locking step 13 may be defined on an inner side surface of the first connector 10, in which the locking step neighbors the first guide rail 11 and includes a surface of the first guide rail 11. The locking step 13 of the first connector 10 may engage with the locking lever 30 and a locking lever arm 31.

Before the second connector connects to the first connector 10, the locking lever arm 31 may engage with the locking step 13 and the locking lever 30 may be maintained engaged with the first connector. The first connector 10 may include a groove or a slot for accommodating a locking lever arm protrusion 311 of the locking lever arm 31. For example, when the locking lever arm 31 is caught by the first connector 10, the locking lever arm protrusion 311 may be accommodated by the groove or the slot, and the locking lever arm may not elastically transform or deform.

At least some of the locking lever arm 31 may pass through an outer wall of the first connector 10 and be arranged within the first guide rail 11. For example, the locking lever arm protrusion 311 may pass through an outer wall of the first connector 10 and be at least partially inside the first guide rail 11. In addition, a protective member **10*a* for protecting the engagement structure of the locking step 13 from an external impact may be on an outer side surface of the first connector 10. A space between the protective member 10*a* and the outer side surface of the first connector 10 may allow the locking lever arm 31 to move along an outer surface of the first connector 10**.

The locking lever 30 may be rotatably connected to the first connector 10. The locking lever 30 may prevent the disengagement of the second connector engaging with the first connector 10. The locking lever 30 may be on the rotation shaft on an inner side surface of the first connector 10 and move by rotating around the rotation axis r with respect to the first connector 10. The locking lever 30 may include the locking lever arm 31 and an engagement protrusion 33. The locking lever arm 31 may include the locking lever arm protrusion 311. The locking lever arm 31 may engage with the first connector 10.

The locking lever arm protrusion 311 of the locking lever arm 31 may engage with the locking step 13 on an inner side surface of the first connector 10 and may prevent the locking lever 30 from freely rotating with respect to the first connector 10. The locking lever arm 31 may disengage from the first connector 10 while the second connector connects to the first connector 10. The engagement protrusion 33 may protrude from an inner side surface of the locking lever body 32. The engagement protrusion 33 may prevent the disengagement of the second connector by engaging with the second connector when the second connector engages with the first connector 10. The engagement protrusion 33 may engage with a sub-engagement protrusion of the second connector.

Figure 4A:
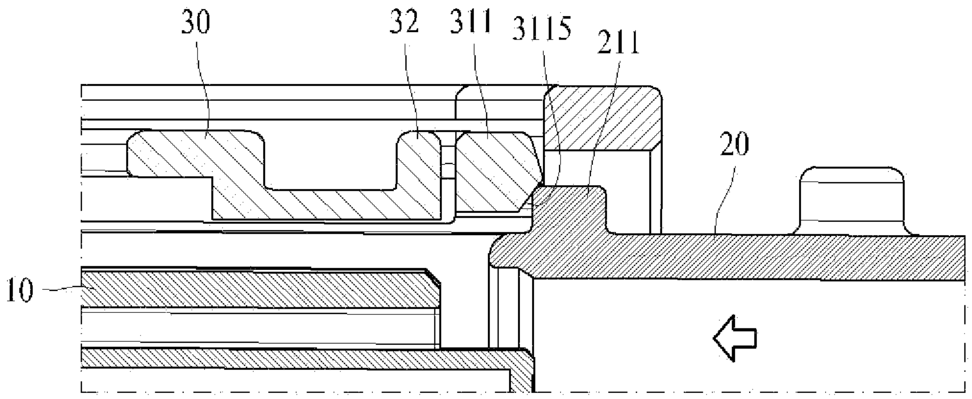
FIG. 4A is a diagram illustrating a process of disengaging a locking lever from a first connector according to an embodiment.
Figure 4B:
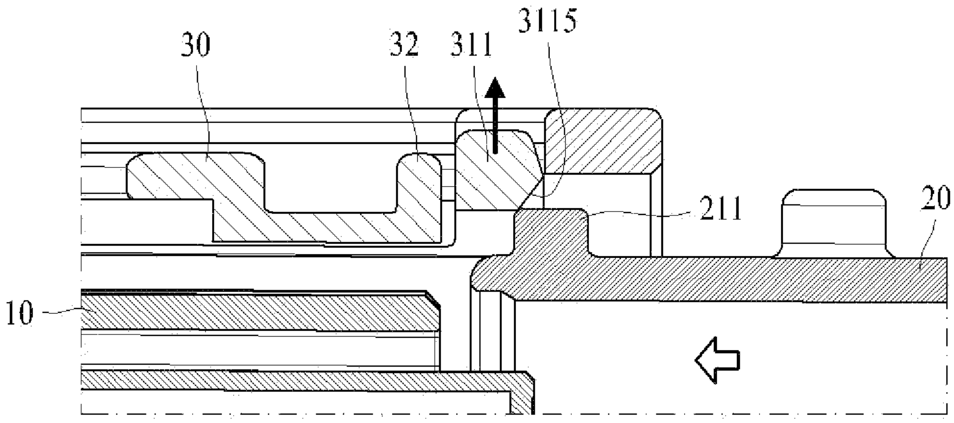
FIG. 4B is another diagram illustrating a further process of disengaging the locking lever from the first connector as shown in FIG. 4A.
Figure 4C:
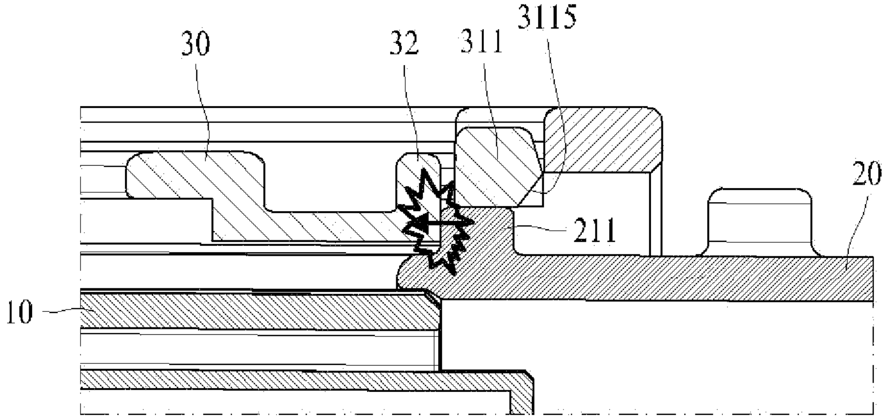
FIG. 4C is another diagram illustrating a further process of disengaging the locking lever from the first connector as shown in FIGS. 4A and 4B.

FIGS. 4A, 4B, and 4C are diagrams sequentially illustrating a process of disengaging a locking lever from a first connector, according to an embodiment. A locking lever 30 may include a locking lever body 32 and a locking lever arm protrusion 311 protruding on a locking lever arm. Before a second connector 20 connects to a first connector 10, the locking lever arm protrusion 311 may engage with the first connector 10 and engage the locking lever 30 with the first connector 10. While the second connector 20 connects to the first connector 10, the locking lever arm protrusion 311 of the locking lever 30 may disengage from the first connector 10.

Referring to FIG. 4A, the second connector 20 may connect to the first connector 10 from one direction. While the second connector 20 connects to the first connector 10, a first guide protrusion 211 of the second connector 20 may touch the locking lever arm protrusion 311 of the locking lever 30. A locking lever inclined surface 3115 tapered in a predetermined direction may be formed on the locking lever arm protrusion 311 such that the first guide protrusion 211 may slide. The first guide protrusion 211 may touch the locking lever inclined surface 3115 and slide and may press the locking lever inclined surface 3115 outward.

Referring to FIG. 4B, when the locking lever inclined surface 3115 is pressed by the first guide protrusion 211, the locking lever arm protrusion 311 may move outward. The locking lever arm on which the locking lever protrusion 311 is defined may elastically transform or bias in a longitudinal direction of the locking lever arm such that the locking lever arm protrusion may move outward. When the first guide protrusion 211 elastically transforms the locking lever arm and the locking lever arm protrusion 311 moves outward, the locking lever arm protrusion 311 may disengage from the first connector 10. When the locking lever arm is elastically transformed and the locking lever arm protrusion 311 moves outward, the first guide protrusion 211 of the second connector 20 may move toward the locking lever body 32.

Referring to FIG. 4C, the first guide protrusion 211 of the second connector 20 may pass through the locking lever arm protrusion 311 and touch the locking lever body 32. The first guide protrusion 211 of the second connector 20 touching the locking lever body 32 may press the locking lever body 32 in one direction. When the locking lever body 32 is pressed by the first guide protrusion 211, the locking lever 30 may rotate around a rotation axis with respect to the first connector 10.

Figure 5A:
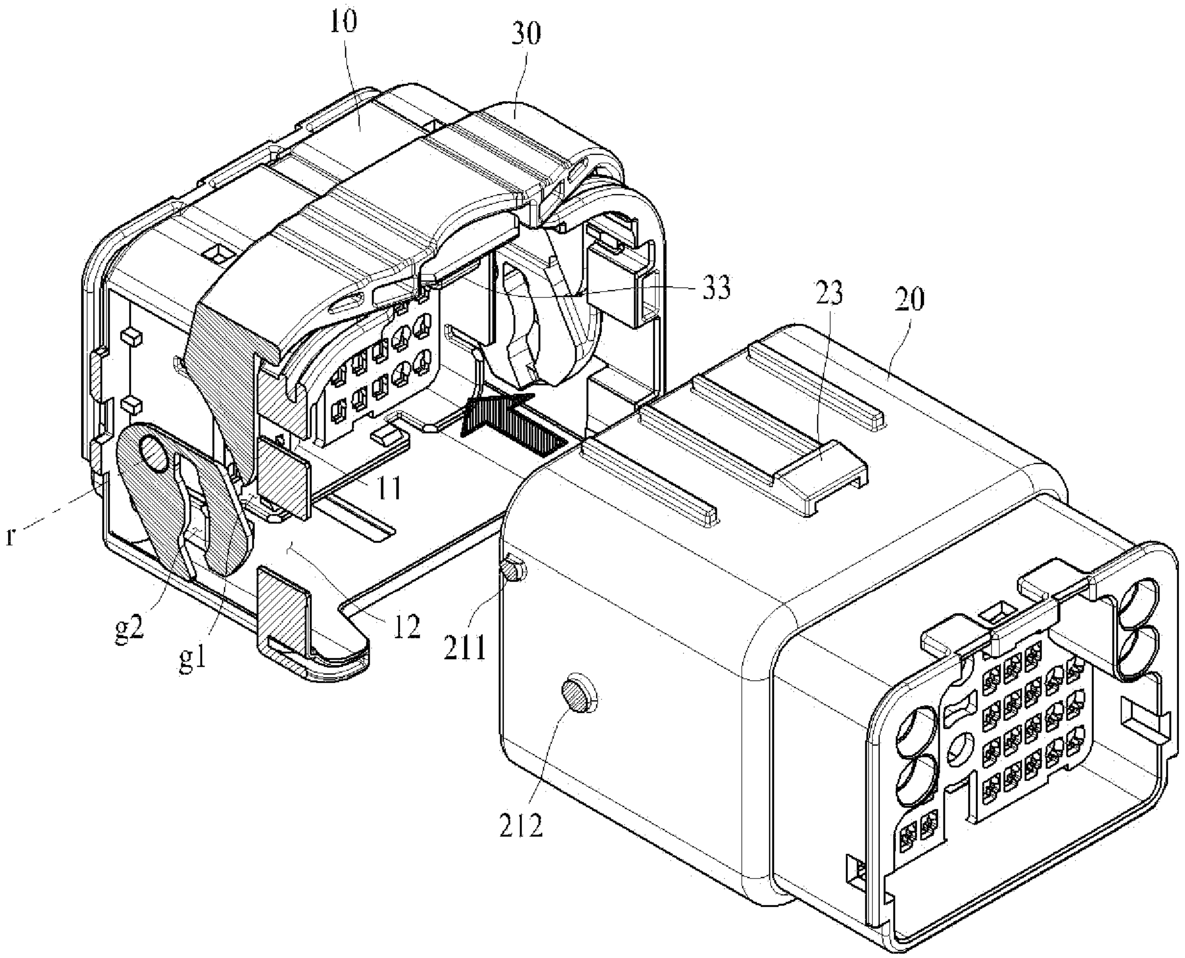
FIG. 5A is a diagram illustrating a process of connecting a second connector to a first connector according to an embodiment.

FIGS. 5A, 5B, 5C, 5D, and 5E are diagrams sequentially illustrating a process of a second connector connecting to a first connector, according to an embodiment. FIG. 5A illustrates a shape before a second connector 20 connects to a first connector 10. Referring to FIG. 5A, a locking lever 30 may rotate with respect to the first connector 10. The locking lever 30 may engage with a rotation shaft on an inner side surface of the first connector 10. The locking lever 30 may engage with the rotation shaft of the first connector 10 and rotate around a rotation shaft r in both directions.

The second connector 20 may include a first guide protrusion 211 and a second guide protrusion 212 for engaging with the locking lever 30 and rotate the locking lever 30 while the second connector 20 connects to the first connector 10. The first guide protrusion 211 and the second guide protrusion 212 may protrude from both side surfaces of the second connector 20. The first guide protrusion 211 and the second guide protrusion 212 may be in a predetermined position on a side surface of the second connector 20 and be spaced apart from each other.

The first connector 10 may include a first guide rail 11 and a second guide rail 12 respectively through which the first guide protrusion 211 and the second guide protrusion 212 pass. The first connector 10 may rotatably support the locking lever 30. The locking lever 30 may include a first guide g1 and a second guide g2 for respectively guiding the first guide protrusion 211 of the second connector 20 and the second guide protrusion 212 of the second connector 20. The first guide protrusion 211 and the second guide protrusion 212 may be respectively accommodated by the first guide g1 and the second guide g2 and may respectively slide along the shape of the first guide g1 and the shape of the second guide g2. The first guide protrusion 211 and the second guide protrusion 212 may rotate the locking lever 30 while respectively engaging with the first guide g1 and the second guide g2 and sliding and moving.

Figure 5B:
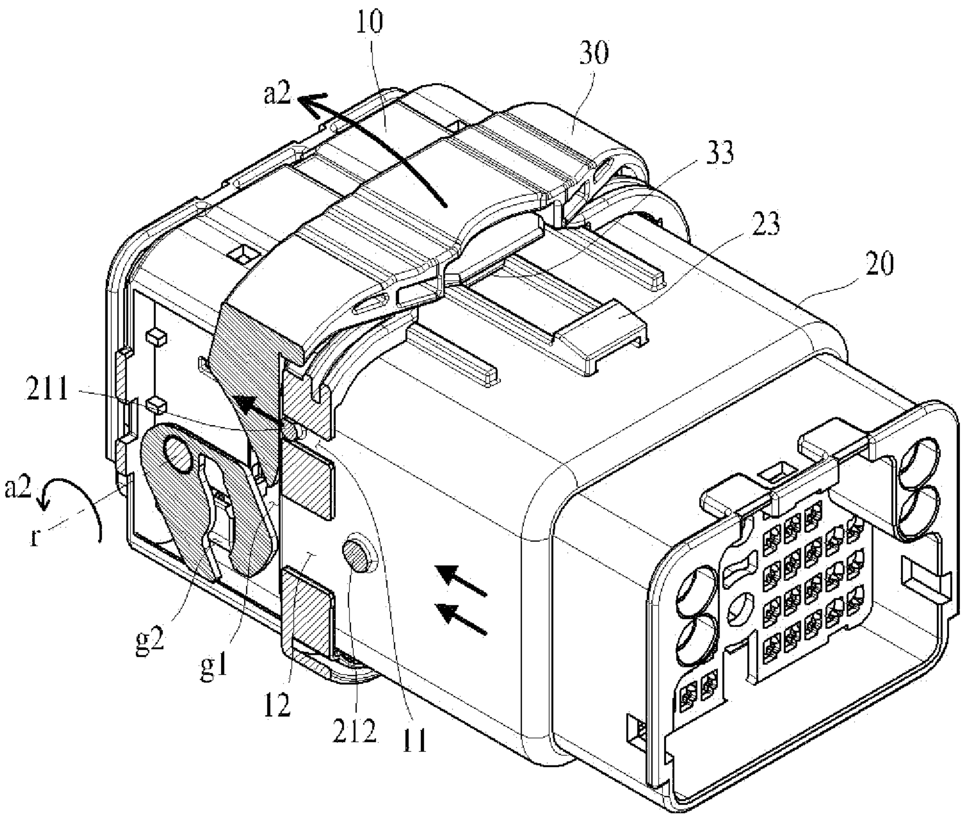
FIG. 5B is another diagram illustrating a further process of connecting the second connector to the first connector.

FIG. 5B illustrates a state in which the second connector 20 starts to connect to the first connector 10. Referring to FIG. 5B, while the second connector 20 connects to the first connector 10, the first guide protrusion 211 of the second connector may pass through the first guide rail 11 of the first connector. While the first guide protrusion 211 passes through the first guide rail 11, a locking lever arm protrusion of the locking lever 30 may disengage from the first connector 10 and the locking lever may be rotatable with respect to the first connector 10. The first guide protrusion 211 of the second connector 20 may touch the locking lever 30 after passing through the first guide rail 11. The first guide protrusion 211 touching the locking lever 30 may be on the first guide g1 of the locking lever. The first guide protrusion 211 touching the locking lever 30 may slide along the first guide g1 and press the locking lever in one direction, and the locking lever may rotate around the rotation axis r with respect to the first connector 10 in a first direction a2 in which the locking lever opens. In this case, the second guide protrusion 212 of the second connector 20 may be yet to pass through the second guide rail 12 of the first connector 10. Accordingly, the second guide protrusion 212 of the second connector 20 may not engage with the second guide g2 of the locking lever 30.

Figure 5C:
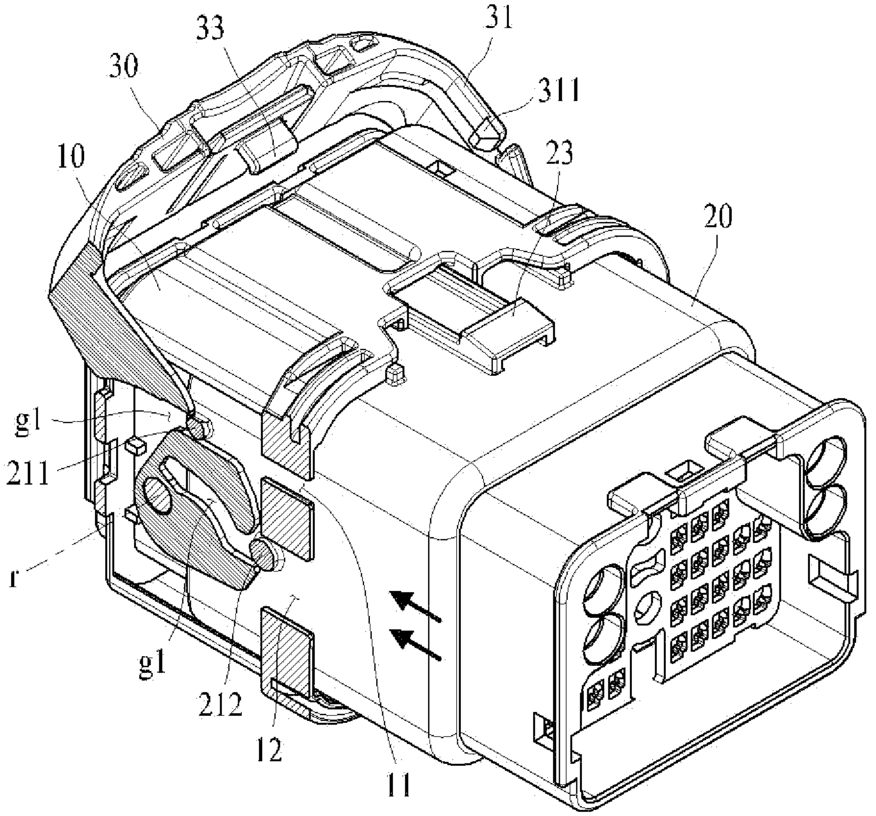
FIG. 5C is another diagram illustrating a further process of connecting the second connector to the first connector.

FIG. 5C illustrates a state in which the locking lever 30 is fully opened. Referring to FIG. 5C, a connection to the first connector 10 may be performed by the second connector 20, and the first guide protrusion 211 of the second connector may slide along the first guide g1 of the locking lever 30. The first guide protrusion 211 may slide along the first guide g1 and press the locking lever 30 in an opening direction, the locking lever may rotate around the rotation axis r in the opening direction. The locking lever may touch the first connector 10 inside the first connector 10 after rotating at a predetermined angle. The locking lever 30, by touching the first connector 10, may be in a fully open state in which rotation in the opening direction is restricted. In this case, the first guide protrusion 211 of the second connector 20 may still be on the first guide g1 of the locking lever 30, and the second guide protrusion 212 of the second connector may pass through the second guide rail 12 of the first connector 10 and may be connectable to the second guide g2 of the locking lever.

Figure 5D:
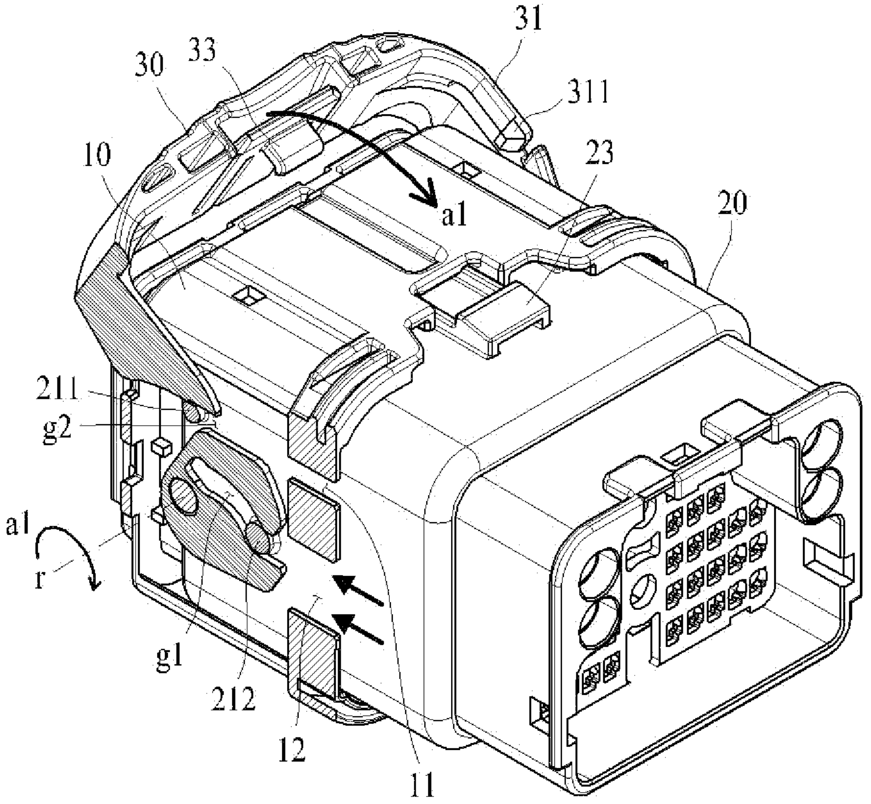
FIG. 5D is another diagram illustrating a further process of connecting the second connector to the first connector.

FIG. 5D illustrates a state in which the locking lever 30 performs closed rotation as a result of the position of the second connector 20. Referring to FIG. 5D, when the second connector 20 is connected to the first connector 10, the second guide protrusion 212 of the second connector may enter the second guide g2 of the locking lever 30. The second guide protrusion 212 may enter the second guide g2 of the locking lever 30 and touch the second guide g2 and may slide and move inside the second guide g2 along the shape of the second guide g2. When the second guide protrusion 212 engages with the second guide g2 and slides therein, the locking lever 30 may move by rotating around the rotation axis r with respect to the first connector 10 in an engagement direction a1 (a first direction) of the locking lever 30. In this case, the first guide protrusion 211 may slide and move along the first guide g1 of the locking lever 30. The shape of the first guide g1 and the shape of the second guide g2 may be in a predetermined form in which the first guide protrusion 211 and the second guide protrusion 212 may respectively slide and move. When the locking lever 30 rotates in the first direction a1, an engagement protrusion 33 of the locking lever 30 may move toward a sub-engagement protrusion 23 of the second connector 20.

Figure 5E:
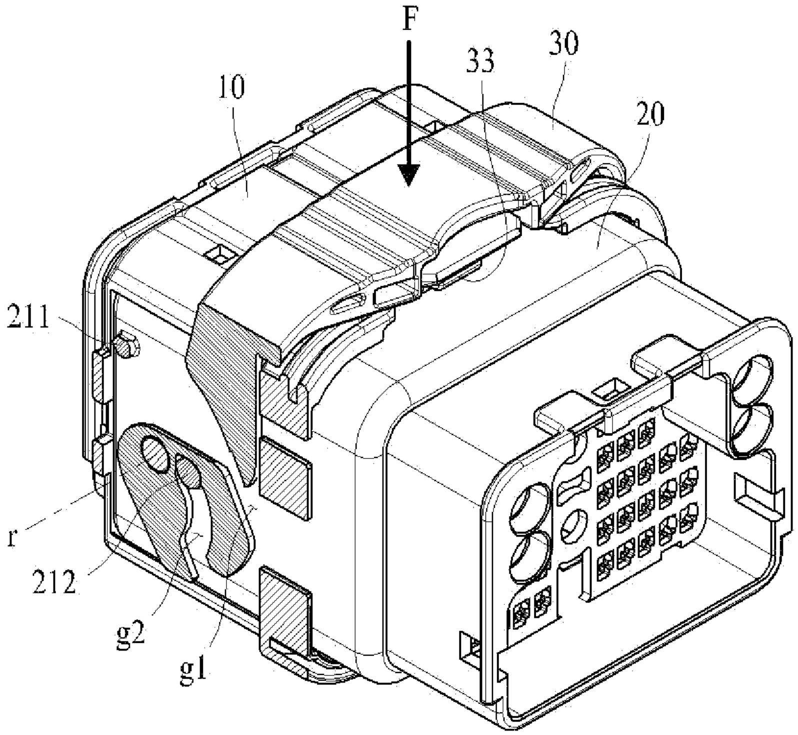
FIG. 5E is another diagram illustrating a further process of connecting the second connector to the first connector.

FIG. 5E illustrates a state in which the locking lever 30 is fully closed. Referring to FIG. 5E, when the second connector 20 performs a connection to the first connector 10, the second guide protrusion 212 may slide up to an edge of the second guide g2. In this case, the first guide protrusion 211 may have fully passed through the first guide g1. The second connector 20 may fully connect to the first connector 10 when an edge of the second connector 20 touches an inner side surface of the first connector.

During a sliding process of the second guide protrusion 212, when the locking lever 30 continues to rotate around the rotation axis r in the first direction, the engagement protrusion 33 of the locking lever 30 may touch a surface of the second connector 20. The engagement protrusion 33 may engage with a sub-engagement protrusion of the second connector 20. When the engagement protrusion 33 engages with the sub-engagement protrusion, the locking lever 30 may prevent the second connector 20 from arbitrarily disengaging from the first connector 10. When the engagement of the engagement protrusion 33 with the sub-engagement protrusion is insufficient, the engagement protrusion may be fully engaged with the sub-engagement protrusion with some external force F applied to the locking lever 30 in an engagement direction. When the locking lever 30 is fully closed, a locking lever arm of the locking lever 30 may engage with the first connector 10 again.

By using the configuration described above, a locking lever may move to a position where a connector may be engaged only in a process of connecting a second connector to a first connector without the need for a user to manually operate the locking lever. The user may easily press the locking lever and engage the first connector with the second connector. In other words, in the process of the second connector connecting to the first connector, the locking lever may rotate in an opening direction and in a closing direction sequentially. In addition, the locking lever caught by the first connector before the second connector connects to the first connector may be released by the first connector in the process of the second connector connecting to the first connector. Before the second connector connects to the first connector, the locking lever may maintain a caught state with the first connector, which may prevent damage to the locking lever due to an external impact while carrying or operating the first connector or prevent the locking lever from disengaging from the first connector. Accordingly, the user may not need to inconveniently operate the locking lever and a connector may be easily assembled.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word “a” or “an” should be understood as not excluding plural of the elements or steps, unless such exclusion is explicitly stated. Furthermore, references to “one embodiment” of the present disclosure are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

What is claimed is:

1. A connector assembly, comprising:

a first connector including a first guide rail and a first terminal;

a second connector adapted to engage with the first connector, including:

a second terminal adapted to be connected to the first terminal; and a first guide protrusion protruding from a side surface of the second connector;

a locking lever rotatably connected to the first connector and adapted to engage with the second connector for preventing the second connector from disengaging from the first connector, the first guide protrusion adapted to disconnect the locking lever from the first connector and bias the locking lever in an opening direction to an open position, the first guide rail accommodates the first guide protrusion.

2. The connector assembly of claim 1, wherein the locking lever comprises:

a locking lever body rotatable around an axis of the first connector; and an engagement protrusion extending from an inner side surface of the locking lever body and adapted to engage with the second connector when the first connector is connected to the second connector.

3. The connector assembly of claim 2, wherein the locking lever further comprises a locking lever arm extending from the locking lever body and adapted to engage with the first connector and be released from the first connector via a force from the first guide protrusion while the second connector is connected to the first connector.

4. The connector assembly of claim 3, wherein the locking lever arm is biased by the first guide protrusion in an outward direction away from the first connector and is disconnected from the first connector.

5. The connector assembly of claim 3, wherein the second connector further comprises a sub-engagement protrusion extending from an upper side surface of the second connector and engaging with the engagement protrusion.

6. The connector assembly of claim 3, wherein at least a portion of the locking lever arm extends to an inside of the first connector from an outside of the first connector.

7. The connector assembly of claim 6, wherein the portion of the locking lever arm is arranged within the first guide rail.

8. The connector assembly of claim 1, wherein the second connector further comprises a second guide protrusion extending from a side surface thereof and spaced apart from the first guide protrusion, the second guide protrusion adapted to rotate the locking lever in an engagement direction while the second connector connects to the first connector.

9. The connector assembly of claim 8, wherein the first guide protrusion and the second guide protrusion slidably engage with the locking lever.

10. The connector assembly of claim 9, wherein the locking lever comprises a first guide accommodating the first guide protrusion and a second guide spaced apart from the first guide and accommodating the second guide protrusion.

11. The connector assembly of claim 10, wherein, while the second connector connects to the first connector, the first guide protrusion rotates the locking lever in the opening direction, and sequentially, the second guide protrusion rotates the locking lever in the engagement direction.

12. The connector assembly of claim 1, wherein the second connector further defines a second guide protrusion spaced apart from the first guide protrusion, the second guide protrusion rotating the locking lever in an engagement direction as the second connector is connected to the first connector.

13. The connector assembly of claim 12, wherein the locking lever defines a first guide accommodating the first guide protrusion and a second guide spaced apart from the first guide and accommodating the second guide protrusion.

14. A connector assembly, comprising:

a first connector;

a locking lever rotatably attached to the first connector, the locking lever includes a locking lever arm engaging with the first connector; and a second connector engageable with the first connector and defining a first guide protrusion extending from a surface thereof, in a closed position the locking lever engaging with the second connector and preventing the second connector from disengaging from the first connector, the first guide protrusion disconnecting the locking lever from the first connector and biasing the locking lever in an opening direction toward an open position, the locking lever arm is biased by the first guide protrusion in an outward direction away from the first connector.

15. The connector assembly of claim 14, wherein the locking lever arm is released from the first connector via a force from the first guide protrusion as the second connector is connected to the first connector.

16. The connector assembly of claim 15, wherein the first connector further includes a first guide rail accommodating the first guide protrusion.

17. The connector assembly of claim 16, wherein at least a portion of the locking lever arm extends to an inside of the first connector from an outside of the first connector.

18. The connector assembly of claim 17, wherein the portion of the locking lever arm is arranged within the first guide rail.

19. A connector assembly, comprising:

a first connector including a first terminal;

a second connector adapted to engage with the first connector, including:

a second terminal adapted to be connected to the first terminal;

a first guide protrusion protruding from a side surface of the second connector; and a second guide protrusion spaced apart from the first guide protrusion;

a locking lever rotatably connected to the first connector and adapted to engage with the second connector for preventing the second connector from disengaging from the first connector, the locking lever has a first guide accommodating the first guide protrusion and a second guide spaced apart from the first guide and accommodating the second guide protrusion, the first guide protrusion adapted to disconnect the locking lever from the first connector and bias the locking lever in an opening direction to an open position.

* * * * *